(No Model.)
H. E. GIFFORD.
SKATE ROLLER.
No. 305,915. Patented Sept. 30, 1884.
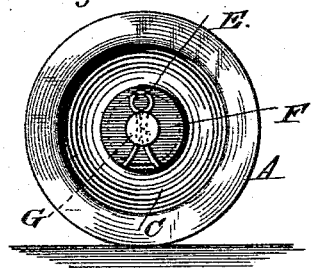
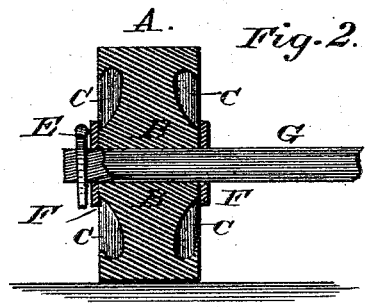
WITNESSES:
Fred. G. Dieterich,
Arthur L. Morsell.
INVENTOR.
Harry E. Gifford
by Louis Baggers & Co.
ATTORNEYS.

UNITED STATES PATENT OFFICE.

HARRY E. GIFFORD, OF NEW BEDFORD, MASS., ASSIGNOR TO LOUIS BAGGER AND AUGUST PETERSON, BOTH OF WASHINGTON, D. C.

SKATE-ROLLER.

SPECIFICATION forming part of Letters Patent No. 305,915, dated September 30, 1884.

Application filed June 22, 1883. (No model.)

*To all whom it may concern:*

Be it known that I, HARRY E. GIFFORD, a citizen of the United States, of New Bedford, in the county of Bristol and State of Massachusetts, have invented certain new and useful Improvements in Skate-Rollers; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of a skate-roller embodying my invention, and Fig. 2 is a cross-sectional view of the same on line $x\,x$, Fig. 1.

Similar letters of reference indicate corresponding parts in all the figures.

My invention has relation to skate-rollers, and has for its object to prevent the oil with which the axle is lubricated from working out upon the periphery or wearing-surface of the roller; and it consists in the improved construction and combination of parts of the same, as will be hereinafter more fully described and claimed.

In the accompanying drawings, A represents a roller, which is mounted upon an axle, G, and has each of its faces provided near the periphery with an annular groove or crease, C, of the form shown in Fig. 2 of the drawings.

B indicates the hub of the roller.

F F represent washers placed upon the axle G, one on either side of the roller A. These washers are each of a greater diameter than the faces of the hub with which they come in contact, so as to form a projecting rim or flange when in contact with the hub, as will be clearly seen by reference to Fig. 2 of the drawings.

E indicates spring-keys inserted through holes in the ends of the axle G.

In skate-rollers as ordinarily constructed there is nothing to prevent the oil with which the axle is lubricated from running down the sides of the roller to the edge of its periphery, and in skating the oil works upon the periphery or surface of the roller, thereby rendering the said surface moist and polished, so as to cause the roller to slip while in use, which is a frequent source of falls, &c.

By constructing my improved roller in the manner described the surplus oil from the axle will run down the sides of the roller and be caught in the annular grooves or creases C, from which it will gradually work its way back to the center or hub of the wheel or roller, where it will be caught between the outer faces of the hub B and the washers F F, the washers being made of a greater diameter than the faces of the hub, in order to prevent the oil from escaping over the edge of the washers, as would be the case if the washers were cast as small or smaller than the faces of the hub.

From the foregoing description, taken in connection with the accompanying drawings, the construction of my improved skate-roller will readily be understood without requiring extended explanation.

It will be seen that my improved roller is exceedingly simple in construction, and that it is devoid of all complicated parts which are liable to break or get out of order.

I claim—

1. As an improvement in skate-rollers, the concentric annular ogee-shaped groove or crease C. on each of its sides or faces, near its periphery, adapted to catch the oil as it flows from the center, as and for the purpose shown and set forth.

2. The improved skate-roller herein shown and described, consisting of the cylindrical body A, provided with an annular ogee-shaped groove or crease, C, on each of its sides or faces, near its periphery, substantially as described, for the purpose set forth.

3. The combination of the roller A, provided with an annular ogee-shaped groove or crease, C, on each of its sides or faces, near its periphery, with the washers F F, of larger diameter than the hubs, and adapted to fit against the outer faces of the hub B, all constructed and combined substantially as and for the purpose shown and described.

In testimony that I claim the foregoing as my own I have hereunto affixed my signature in presence of two witnesses.

HARRY E. GIFFORD.

Witnesses:
ARTHUR E. PERRY,
WILLIAM B. SMITH.